US006796505B2

(12) United States Patent
Pellaumail et al.

(10) Patent No.: US 6,796,505 B2
(45) Date of Patent: Sep. 28, 2004

(54) TERMINAL LOCKING SYSTEM

(75) Inventors: John Pellaumail, Wargrave (GB); Thomas Roslak, Eastport, NY (US); David Cole, Swindon (GB); Jerome Swartz, Old Field, NY (US); Robert Beach, Los Altos, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/173,241

(22) Filed: Jun. 17, 2002

(65) Prior Publication Data

US 2002/0158130 A1 Oct. 31, 2002

Related U.S. Application Data

(63) Continuation of application No. 09/190,485, filed on Nov. 12, 1998, now Pat. No. 6,409,086, which is a continuation-in-part of application No. 08/907,785, filed on Aug. 8, 1997, now abandoned.

(51) Int. Cl.[7] .................................................. G06K 7/10
(52) U.S. Cl. .............................. 235/462.13; 235/472.01
(58) Field of Search ....................... 235/462.13, 472.01, 235/472.02, 472.03, 375, 435, 378, 379, 436, 380, 381, 382, 383; 340/825.33, 825.34, 568; 705/21, 22, 23, 26, 27, 28, 1

(56) References Cited

U.S. PATENT DOCUMENTS 5,321,242 A 6/1994 Heath ......................... 235/382
5,397,882 A 3/1995 Van Solt ..................... 235/381
5,426,423 A 6/1995 Raimbault et al. ..... 340/825.35
5,468,942 A 11/1995 Oosterveen et al. ........ 235/383
5,484,991 A 1/1996 Sherman et al. ............ 235/472
5,531,482 A 7/1996 Blank .......................... 283/67
5,640,002 A 6/1997 Ruppert et al. ............. 235/472
5,825,002 A 10/1998 Roslak ....................... 235/375
6,409,086 B1 * 6/2002 Pellaumail et al. .... 235/462.13

* cited by examiner

*Primary Examiner*—Karl D Frech
(74) *Attorney, Agent, or Firm*—Amin & Turocy, LLP

(57) ABSTRACT

A wireless system for self-service shopping is described that includes a customer identification device with an optically readable code, a portable terminal that includes an optical code reader, a local area radio, a terminal controller, and a locking mechanism, a master station, consisting of a master controller and a master radio, and a receiving rack for the portable terminals to which the scanners may be locked using the locking mechanism. A customer presents his or her identification device to a terminal which reads the code, the code is transferred by radio to the master controller which checks the identification and, if valid, sends an authorized signal by radio to the terminal to unlock the scanner. In addition, several locking mechanisms are described that are controlled by the terminal controller. An additional feature provides a shopping cart with a receiving cradle for a portable terminal that allows the customer to lock the scanner onto the cart for hands-free shopping.

19 Claims, 6 Drawing Sheets

TERMINAL LOCKING SYSTEM

REFERENCE TO RELATED APPLICATIONS

This application is a continuation of U.S. patent application Ser. No. 09/190,485 filed Nov. 12, 1998, now U.S. Pat. No. 6,409,086, which is a continuation-in-part of U.S. patent application Ser. No. 08/907,785 filed Aug. 8, 1997, now abandoned.

BACKGROUND OF INVENTION

This invention relates to wireless optical scanning devices, locking mechanisms for use in self-service shops, and improved locking arrangements for portable data acquisition terminals.

DESCRIPTION OF THE RELATED ART

Self service optical scanning systems have been described that allow shoppers in self-service stores to shop by taking items off of shelves, scanning the items' identifying bar code with a portable terminal, placing the items in their shopping cart, and checking out without standing in long lines. Check-out is simplified and made more efficient because the customer in charged for the items previously scanned, e.g. by reading out a memory of the terminal. The system generates an itemization and account of purchases is possible without the need for the cashier to scan the items individually. A store can use this system to reduce the need for cashiers and for processing regular customers more quickly.

U.S. Pat. No. 5,468,942 describes a self-service system having a scanner terminal dispensing device that is accessible from two sides. The dispensing apparatus holds the terminals and includes a customer identification station whereat a customer presents an ID card and, upon confirmation of the customer's identity, the host computer sends a data signal through the dispenser apparatus to release a terminal for use by the customer.

The disclosed configuration requires that each terminal station on the dispensing rack be wired for data communication with the host computer in order for the computer to release a selected terminal among many terminals and to enable data communication between the host computer and the terminals. This wiring can be extensive, making the dispensing rack costly to assemble and maintain. It is an object of the present invention to provide improved self-service shopping systems and improved terminal locking mechanisms.

SUMMARY OF THE INVENTION

In accordance with one aspect of the present invention, there is provided an improved method of controlling release of a terminal from a terminal storage rack. According to the method, user identification data is entered into the terminal to operate a lock mechanism in response to the data entry.

The user identification data may be entered manually or by scanning a user identification device. The release may be under control of a master controller which communicates with the terminal.

In accordance with another aspect of the invention, user identification may be presented to a master controller using a machine-readable device or by keying.

In accordance with the invention there is further provided a data acquisition system having a simplified terminal storage rack wherein a host computer communicates with the portable terminals via radio-frequency. According to the invention there is provided customer identification device, a portable terminal that includes an optical code reading device, a terminal radio, a programmed terminal controller, and a locking mechanism. There is further provided a master station that includes a master radio and a programmed master controller, and a terminal receiving and dispensing rack that has terminal receiving positions that engage the terminal locking mechanism. The terminal controller is programmed to cause the terminal radio to send data to the master station and to respond to unlock signals from the master station to operate the locking mechanism. The master controller is programmed to receive codes from the master radio, to process the codes, and to cause the master radio to send unlock signals. The data acquisition system may be a self-service shopping system.

In accordance with the invention there is further provided a cradle for a terminal on a shopping cart. The cart includes a terminal receiving station for receiving and engaging the terminal and the locking mechanism on the terminal is released when the terminal reads a customer identification device. One way to perform the identification is using a terminal controller to verify the customer authorization. Identification can also be performed by a master station that sends radio signals to the terminal to verify the customer authorization.

In accordance with the invention there are provided a variety of alternative arrangements for locking a terminal to a receiving rack, either internal or external to the terminal and controlled by the master controller via the terminal controller. One locking arrangement contains a solenoid operating a lock on the terminal and is activated by RF signals from a master controller. A second locking arrangement contains a solenoid on the terminal receiving rack, and its release may be activated by RF signals to the terminal, which provides electrical signals to operate the solenoid on the receiving rack.

For a better understanding of the present invention together with other and further objects thereof, reference is made to the following description, taken in conjunction with the accompanying drawings, and its scope will be pointed out in the appended claims.

DETAILED DESCRIPTION OF THE INVENTION

Figure 1:
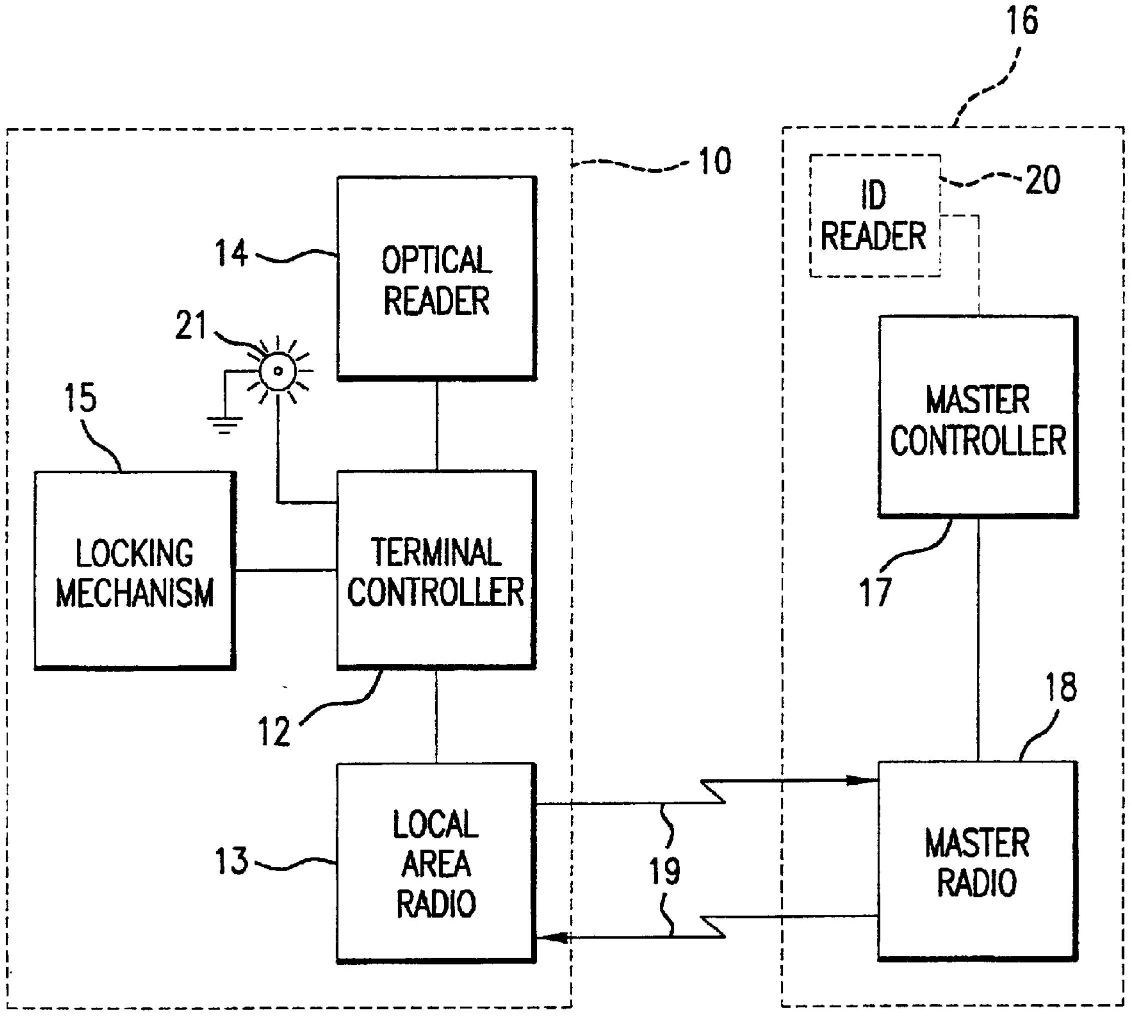
FIG. 1 is a block diagram of a wireless self-service shopping system.

FIG. 1 is a block diagram of one embodiment of the present invention which comprises a wireless self-service shopping system. This particular embodiment includes terminals 10 and a master station 16. The terminal 10 includes a terminal controller 12, a terminal, radio 13, an optical reading device 14, and a locking mechanism 15. The master station 16 includes the master controller 17, the master radio 18 and may include a customer ID reader 20.

The terminal radio and master radio may be a local area wireless network system, such as the Spectrum24® system available from Symbol Technologies, Inc., the assignee of this application. In a shopping environment, a customer can use a terminal to record items to be purchased while shopping. The terminal may either retain the data in its own memory and download to the master station when the customer completes his or her shopping and returns the terminal 10 to a rack or the terminal may transfer the data to the master station as items are scanned. The terminal may also signal to the master station to obtain data relating to item and price for display to the customer on the terminal.

In a first embodiment, in an arrangement similar to that described in U.S. Pat. No. 5,468,942, the customer presents an identification device to an ID reader 20 associated with master station 16. In this embodiment, the identification device may take on a variety of forms, including a magnetic stripe card, smart card or a card having an optical-readable bar code encrypting customer identification. In this first embodiment, the master station 16 will verify the customer's authorization in master controller 17, select a terminal 10 for use by the customer and signal the terminal 10 using local area network master radio 18. The signal 19 from master station 16 is decoded by terminal controller 12 and used to activate locking mechanism 15. In addition, terminal controller 12 may activate a signal light 21 and/or a buzzer on the terminal to signal the customer which terminal 10 has been activated and unlocked. The master controller may also additionally or alternately display the terminal location to the customer as will be described.

Figure 2:
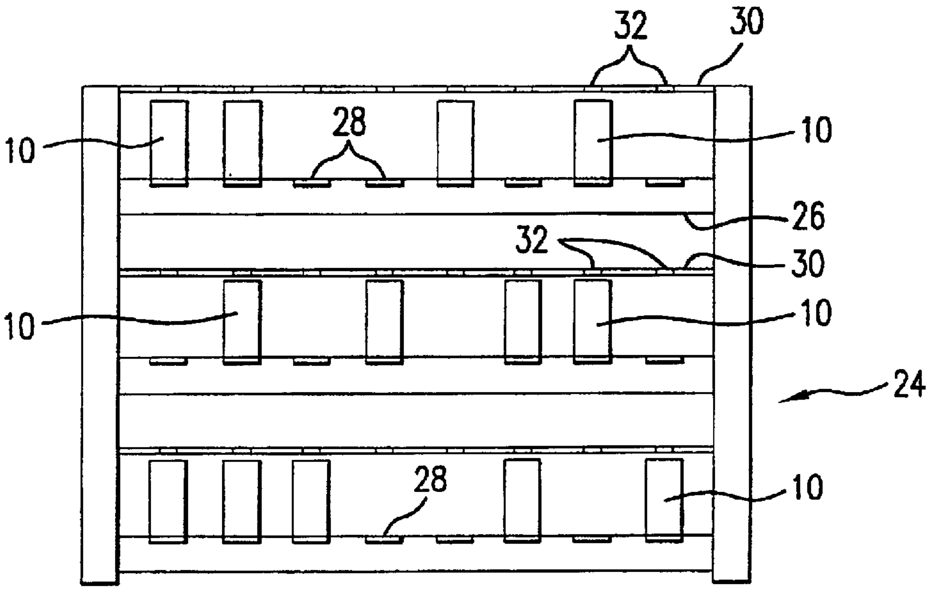
FIG. 2 is a plan elevation view of a terminal receiving rack.

FIG. 2 shows an arrangement of terminals 10 in a terminal receiving and dispensing rack 24. It should be understood that dispensing rack 24 may take on a variety of configurations, such as the two-sided terminal dispensing device shown in U.S. Pat. No. 5,468,942 or a round carousel type terminal dispensing device (not shown). Dispensing rack 24 includes a plurality of shelves 26 each having a plurality of terminal sockets 28 for receiving terminals 10 in a locked configuration. At each terminal socket 28 there are provided connectors that allow electrical power to be provided to a terminal 10 when docked, for charging the battery in terminal 10. Alternately, power may be provided to the terminals by induction. Because the data, corresponding to items to be purchased or customer identification, which is scanned by terminal 10 can be relayed to the master station 16 by radio signal 19, it is not necessary to provide data connections in dispensing rack 24, simplifying the wiring thereof. In addition, it is unnecessary to provide wiring to unlock sockets in rack 24, since this function is also provided by radio link.

Figure 3:
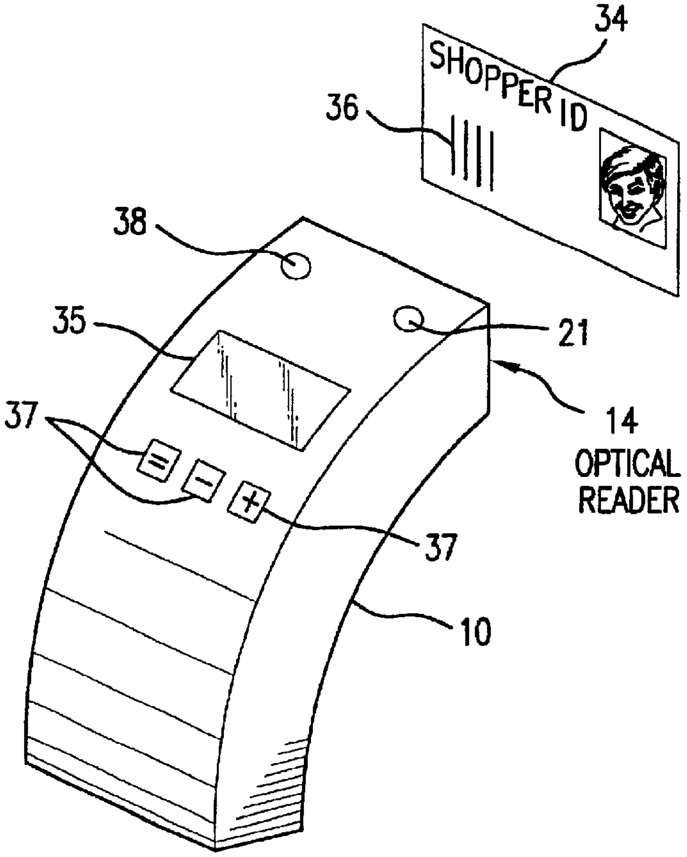
FIG. 3 is a perspective view of a terminal.

In accordance with a second embodiment, the customer identification device 34, shown in FIG. 3 includes an optically readable identification code 36. The customer can checkout a terminal 10 by placing identification device 34 in front of the optical reader 14 of terminal 10 while the terminal is in the receiving rack, whereby the code 36 is read and relayed by terminal controller 12 and terminal radio 13 to master station 16. At master station 16 the authorization of the customer is verified by master controller 17 and, upon verification, an unlock signal is sent to terminal 10 by master radio 18. In either embodiment master controller 17 records the identification of the terminal 10 and customer code 36. Alternatively, the customer identification device could be a smart card (either contact or non-contact) or card with magnetically stored data. The optical reader would be replaced with the corresponding reading device.

Terminal 10 is provided with a liquid crystal or similar display 35 for identifying and providing display of the price of an item being scanned. When the item is scanned by pressing the "plus" button 37, the item and price will be added to the customer's bill. When the item is scanned while pressing the "minus" button 37, the item will be deleted from the bill, as when a customer changes his mind about a purchase and wishes to return an item previously scanned to a shelf. The "equals" button 37 provides the customer with a total of the items being purchased and may also indicate the total number of items scanned. Those skilled in the art will recognize that other functions may also be provided on terminal 10.

During use, a record of items purchased is either maintained in terminal 10 or in master station 16 or both. When the terminal is returned to a rack, the terminal signals the master station that the customer has finished shopping and the master station may cause a statement to be printed. The customer then takes the statement to a cashier to pay for the purchased items without waiting for item-by-item check out. Alternately the customer might present the identification at the cashier and the cashier's terminal will retrieve a statement from the master station. Upon return of the terminal 10 to the rack 24, the terminal reads a bar code with its optical reader. The bar code identifies the location of the terminal in the rack so that it can be stored in the master controller for subsequent use.

In either embodiment, it is desirable for the master controller to rotate the selection of terminals by customers, so that terminals are subjected to even wear and tear, and so that terminals have sufficient time in rack 24 for recharging. In the event selection is made at a remote entry station, assignment may also be made by height where the customer is physically challenged. Selection of terminals in the first system embodiment can be controlled by master controller 17, which selects the terminal and causes illumination or flashing of signal light 21. Light 21 will be extinguished when the terminal 10 is removed from its socket 28 in rack 24, the removal being sensed by the absence of external power, or if the terminal is not removed from its socket 28 within a predetermined time period.

In the first embodiment it may be desirable for a display on master station 16 to indicate to a customer the location of the terminal that has been unlocked in addition to the activation of signal light 21. For this purpose rack 24 is provided with coded socket tags 32, which in the embodiment shown in FIG. 2 comprise bar code tags 32 arranged in a position enabling reading by the optical reader 10 of a terminal when the terminal is in a socket 28. In the rack embodiment of FIG. 2, code tags 32 are arranged on tag support members 30. When an unlock signal is sent to a terminal 10, the optical reader of that terminal is activated to read code tag 32 and signal the master station, thereby indicating the location of the selected terminal, which can also be displayed to the customer at master station 16.

In the second system embodiment, wherein the customer identification device 34 is read by the optical reader 14 of terminal 10, the customer is generally free to select which terminal to present the identification device to. Uniform usage of terminals 10 can be controlled by providing one or more signal lights 21, 38 on terminals 10 (FIG. 3) to indicate to the customer which terminal to use. It should be noted that the master controller can be controlled to activate the terminal "ready" light 21 on less than all terminals that are actually in a ready-to-use condition, so that terminals are used in a uniform fashion. Thus, while all terminals may be charged and ready when a store opens, only a few might display a "ready" light 21, while others show "not ready" light 38, to control the customer selection. In an alternative embodiment, an entry station is provided which reads a customer card 34, communicates the read data to the master controller 17. The controller then communicates an assigned terminal on the entry station display. This permits the master controller to assign terminals in a manner which evenly distributes usage. This system requires a means for the terminal or rack 24 to communicate which of the terminals have a charged battery. In the preferred embodiment the radio 13 is used to communicate the information to the master radio.

Either of the two systems provide an operational check for the system at the time of dispensing a terminal. In the embodiment wherein the code tags 32 are read at the time of dispensing, the reading and transmission of the terminal location code assures operation of the optical reader 14 and local area radio 13 of terminal 10. In the second embodiment, successful operation is confirmed by the successful reading of the identification code 36 on the customer identification card 34 and relay thereof to master station 16.

Figure 4:
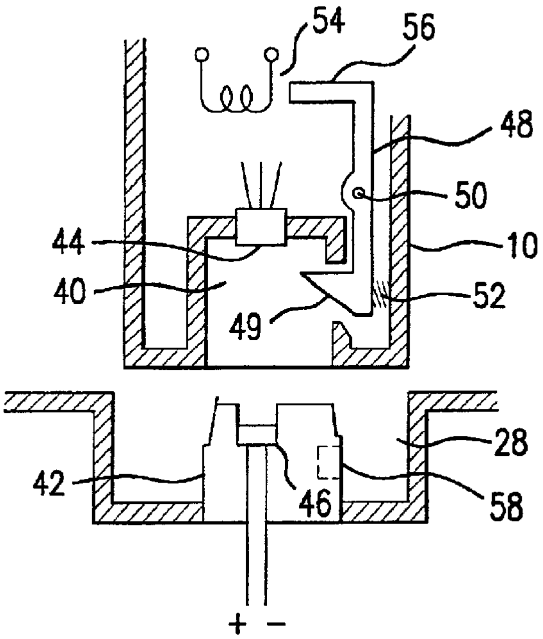
FIG. 4 is a partial cross-sectional view of a first embodiment of a terminal and receiving rack.

Referring to FIG. 4, there is shown an example of a terminal mechanical arrangement for one possible locking mechanism useful in a system according to the present invention. FIG. 4 is a cross-sectional view of a base portion of a terminal 10 and terminal socket 28. Terminal 10 includes a lower recess 40 which is sized and arranged to receive protrusion 42 within socket 28. Within recess 40 there is provided an electrical connector 44, which connects to a mating connector 46 on protrusion 42 when terminal 10 is placed fully into socket 28.

Connectors 44, 46, are provided to primarily supply current to terminal 10 from dispensing rack 24. Accordingly, all positions on rack 24 have the same wiring in a relatively simple configuration. In other arrangements, additional wiring may be provided.

The locking mechanism of FIG. 4 includes a detent lever 48 pivotable about axis 50 and urged clockwise by compression spring 52. When terminal 10 is inserted into socket 28, projection 42 deflects lever 48 counterclockwise until the lower pawl 49 of lever 48 is received into slot 58 on projection 42, locking the terminal into slot 28. When an unlock signal is received by terminal 10, current is supplied to solenoid coil 54 to draw armature 56 and rotate lever 48 counterclockwise to release terminal 10. Those skilled in the art will recognize that other mechanical arrangements within terminal 10 are possible, and variations can include slide locks, rotating locks and release buttons to supply current to solenoid 54 only during the terminal removal process.

In the locking mechanism of FIG. 4, it is apparent that only fixed mechanical parts of the locking arrangement are provided on the rack 24 and socket 28. Accordingly, it is easy to duplicate such mechanical configuration as part of a terminal cradle 60 provided on a shopping cart 62. In this arrangement when a customer places the terminal 10 in the socket of terminal cradle 60, it becomes locked therein and is released only when the customer again presents a customer identification device 34 to the optical reader of terminal 10. Thus terminals used by different customers do not become mixed up, and a terminal checked out by one customer is not easily taken by another.

In the process of unlocking a terminal that has already been checked out by a customer from a terminal carrier 60, the terminal controller or master controller verifies that the customer identification device 34 presented to the terminal is the same as the identification device used to check out the terminal.

Figure 6:
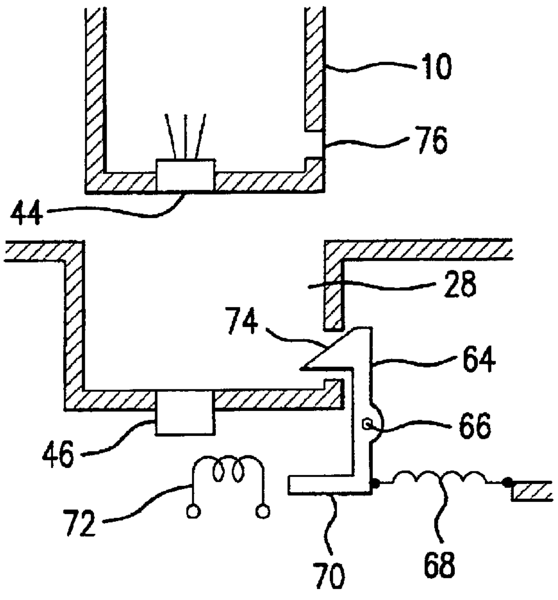
FIG. 6 is a cross-sectional view of an alternate terminal locking mechanism.

FIG. 6 shows an alternate mechanical arrangement wherein the base of terminal 10 includes connector 44 and is received within socket 28. In the FIG. 6 arrangement no projection is provided within socket 28. Further, in the FIG. 6 arrangement a detent lever 64 is mounted on rack 24 adjacent socket 28. Lever 64 pivots about axis 66 and is urged counterclockwise by tension spring 68, Pawl 74 is arranged to engage slot 76 on terminal 10. Solenoid coil 72 is arranged to draw armature 70, rotating lever 64 clockwise to release, terminal 10.

While coil 10 is provided as part of rack 24, which includes many sockets 28, each requiring a locking mechanism, it is intended to avoid individual wiring to such coils and thereby simplify the rack wiring. This object is achieved by controlling current to coil 72 by terminal 10 using arrangements similar or equivalent to those described below. In particular, by arranging coil 72 as part of socket 28, the added weight on terminal 10 is avoided and current for coil 72 can be provided by the stationary power supply rather than by the batteries of terminal 10.

Figure 7:
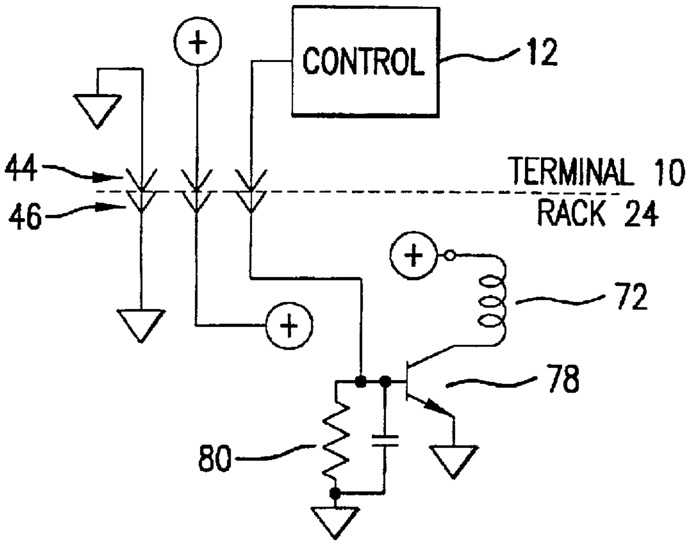
FIG. 7 is a schematic diagram for a first locking circuit usable with the FIG. 6 locking mechanism.

One arrangement for operating coil 72 using a control signal sent by radio link to terminal 10 is shown schematically in FIG. 7. In this arrangement a positive going logic signal is provided through a pin of connectors 44, 46 from the terminal controller 12 to a relay transistor 78 which turns on current through coil 72. Filter circuit 80 holds the coil current for a brief period until the terminal is withdrawn after the terminal controller signal is lost by the opening of the connector. Alternate arrangements, including providing transistor relay 78 on terminal 10 are apparent. Alternative to using a pin of connectors 44, 46, to relay the control signal from terminal 10 to rack 24, it is possible to provide optical signal coupling or magnetic coupling, for example using a reed switch.

Figure 8:
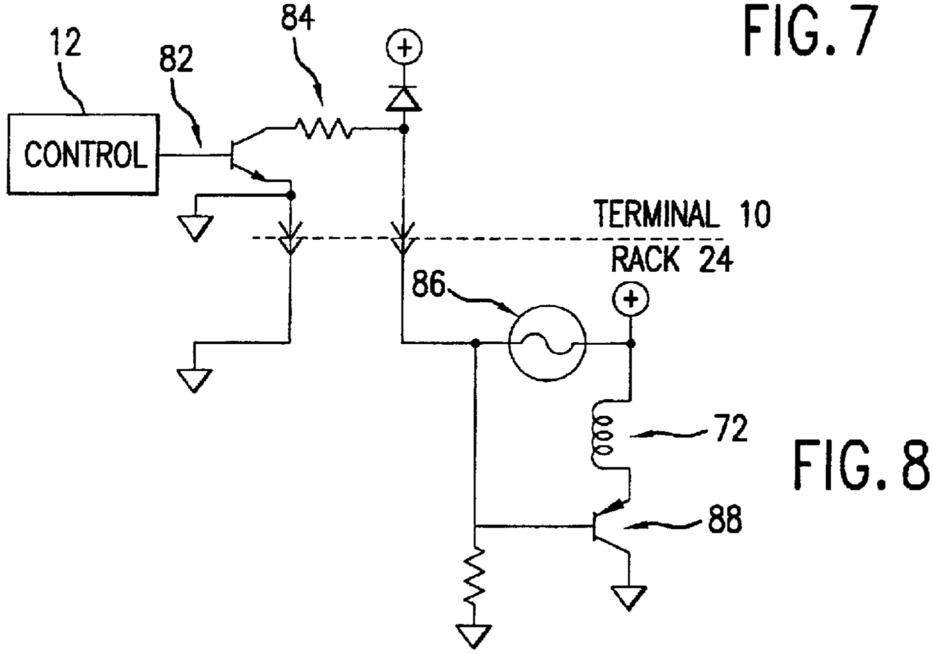
FIG. 8 is a schematic diagram for an alternate locking circuit usable with the FIG. 6 locking mechanism.

Another arrangement for operating coil 72 without using an extra pin on the connectors is shown in FIG. 8. In this arrangement the unlocking signal from terminal controller 12 turns on transistor 82 drawing a large current through resistor 84 on terminal 10, overloading self-resetting fuse 86 on rack 24. When fuse 86 opens, transistor 88 turns on drawing current through coil 72. Following a delay which allows terminal 10 to be removed, fuse 86 resets, causing transistor 84 to turn off.

Figure 5:
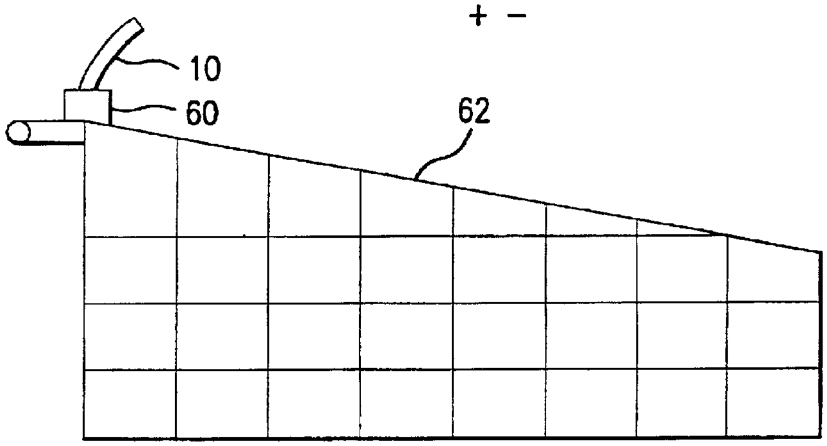
FIG. 5 is a diagram of a shopping cart with a terminal receiving cradle.

It will be recognized that the circuits of FIGS. 7 and 8 are not advantageous in a system wherein the terminal 10 is to be locked to terminal cradle 60 as shown in FIG. 5, since normally cradle 60 is not powered. It is possible, however, to supply power to cradle 60 from the battery on terminal 10.

Figure 9:
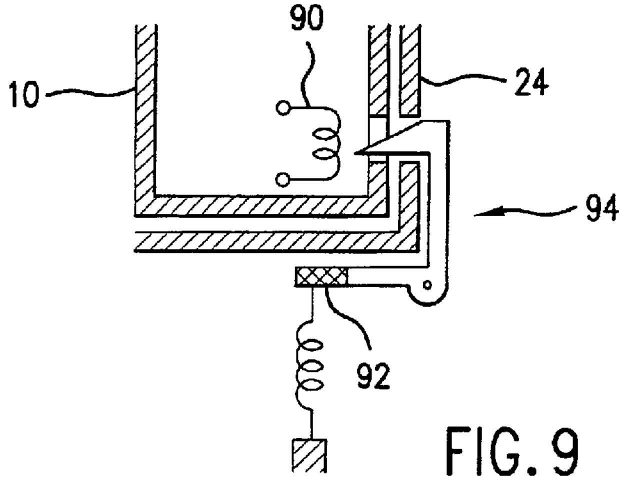
FIG. 9 is a cross-sectional view of a further alternative terminal locking mechanism.

FIG. 9 shows a further alternative arrangement for a locking mechanism, which can be used with either rack 24 or terminal cradle 60. In the FIG. 9 arrangement, coil 90 is carried by and operated by terminal 10 and used to attract armature 92 on lever 94 mounted to rack 24.

From the foregoing it becomes evident that a wide range of terminal-activated locking arrangements can be used in connection with the terminals of the invention and that the examples set forth herein are exemplary only and not intended to limit the appended claims. In addition, those skilled in the art will recognize that the locking arrangements of the invention may be generally used with portable terminals to secure them when not being used and to enable such terminals to be released by an authorized user. In such arrangements, a terminal may be secured to a receiving rack at a user's workplace or in a userjs vehicle and released only by scanning a user's identification device or alternately by a user entering a secret identification code on a terminal keyboard, keypad or touch screen display.

Figure 10:
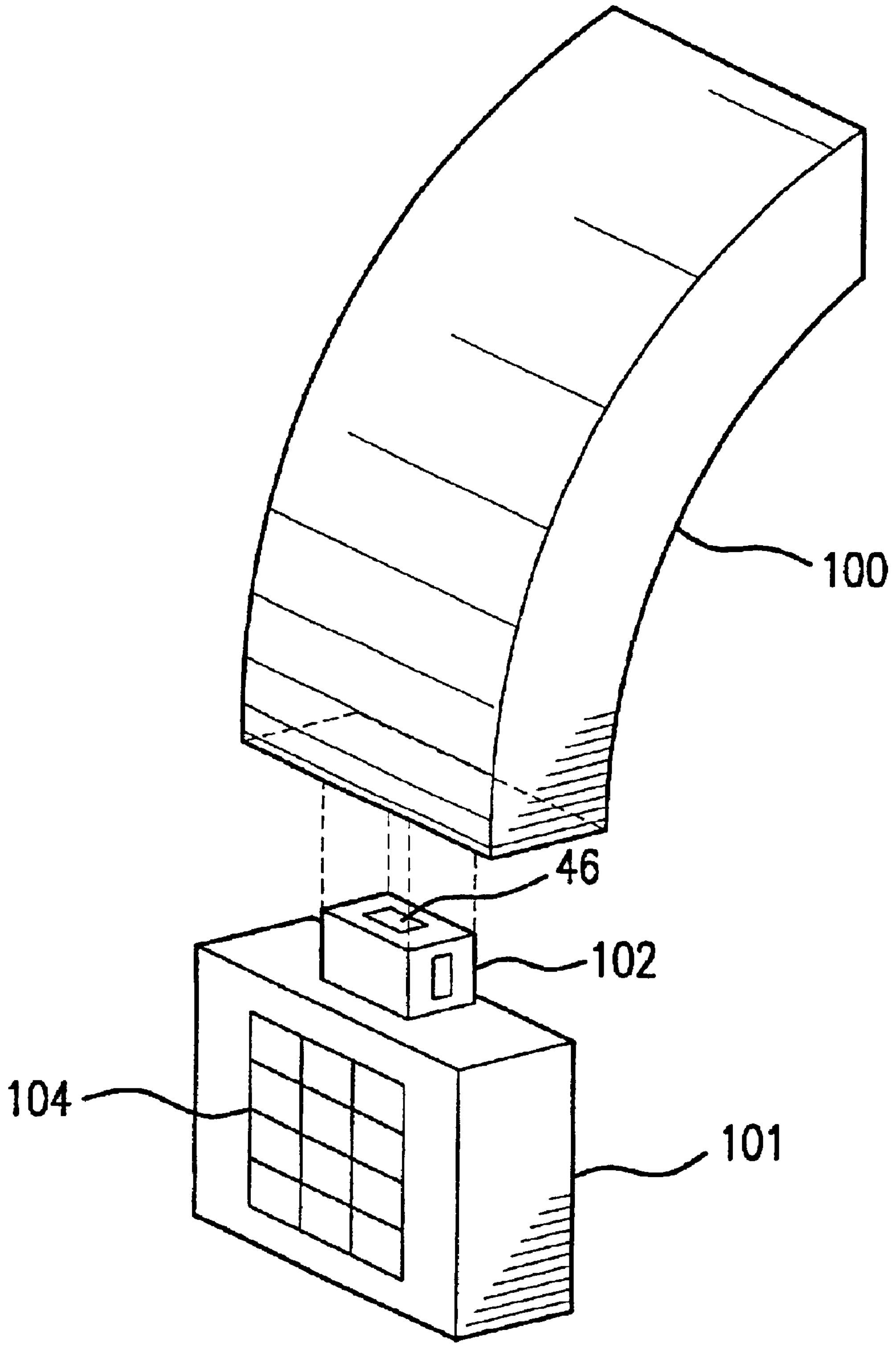
FIG. 10 is a perspective view of a portable terminal having two terminal members.

FIG. 10 illustrates a further configuration for use of the terminals 10 of the invention for alternative functions. In FIG. 10 it is seen that a first terminal member 100, which corresponds, for example, to the self-service terminals previously described, may be attached by its base locking mechanism and connector to a second terminal member 101 which has projection 102 and connector 46. By the addition of second member 101, terminal 100 may be provided with enhanced functionality, for example for inventory scanning. Because inventory personnel typically use a terminal for a longer time period, second member 101 may include an additional battery to provide extended terminal use. In addition, second member 101 may be provided with extended memory containing an inventory operating program code and extra memory for inventory data. The second member can also include an alpha or numeric keypad 104, whereby inventory personnel can, manually enter data corresponding, e.g., to the number of items in inventory corresponding to the scanned code. The second member may also include a printer for printing product tags and shelf tags, providing such information as pricing, restriction information and/or bar code symbologies.

In an alternative preferred embodiment, a heightened security system is provided for releasing the terminal from its locking mechanism. A user is provided with an optically coded data portion on a card such as a one dimensional or two dimensional bar code. Once this code is read by the system controller or terminal, as the case may be, the user is required to enter a pin code on a numeric keypad provided either on the terminal or in the vicinity of the card reader. This ensures that users who lose their cards will have additional protection from system abuse.

In an alternative preferred embodiment, the authorization code 36 is embedded in a PDF417 bar code, or some other form of coded symbology, stored on a customer identification device 34 in an encrypted format. The optical reader 14 on terminal 10 reads the encrypted data from the coded symbology, recovers a security code stored within the data and releases the locking mechanism only upon entry of the security code on data entry means on the terminal 10. The security code could take on any one of numerous encryption and coding schemes.

Figure 11:
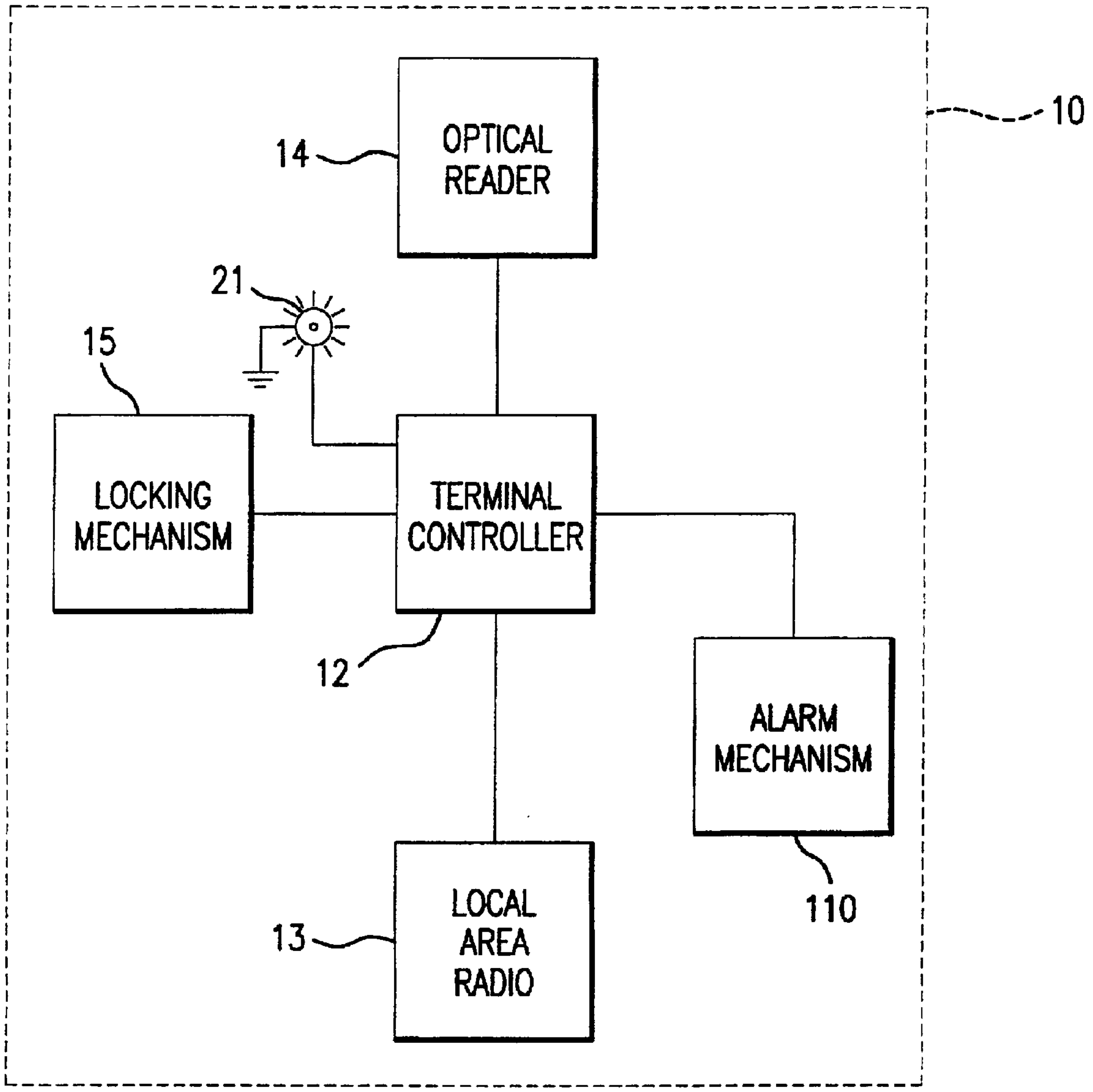
FIG. 11 is an alternative embodiment of a portable terminal.

In an alternative embodiment, shown in FIG. 11, a terminal 10 is equipped with an alarm mechanism 110.

The mechanism signals the system and/or store personnel that the terminal has been removed from the terminal rack without authorization. The alarm mechanism can have an audible and/or visual indicator 21 for signaling an unauthorized removal. Additionally, the mechanism may be connected to the local area radio 13, for transmitting the unauthorized removal event to the master station.

The alarm mechanism can be implemented via an electromechanical switch. Removal of the terminal produces either a closure, or an opening, of the switch's electrical contacts. The contacts' status is then communicated to the terminal controller which monitors the status of the terminal. If the removal of the terminal was authorized by the master station, the status of the electromechanical switch is ignored. Otherwise, the alarm is signaled.

Instead of an electromechanical switch, the alarm mechanism may utilize a rack-to-terminal proximity sensor. The physical removal of the terminal from the rack causes the sensing mechanism to change its status. Change of status is then acted upon by the terminal controller.

In alternative embodiments, the proximity sensor could be replaced by an electronic article surveillance (EAS) tag or a radio frequency identification device (RFID).

Regardless of the technology used, the goal is to have a system that can monitor a removal of the terminal from the terminal rack and appropriately signal an unauthorized terminal removal.

In addition to being able to monitor unauthorized removal of the terminal from the terminal rack, the system could also monitor removal of the terminal from inside the boundaries of a designated area. This will prevent theft of the terminals and inadvertent mistakes by customers who forget to return the terminal to the rack upon completion of their shopping transaction.

The implementation of the boundary sensing can be accomplished using RFID tag technology. Local access points can be set up throughout the designated area, typically the store, to monitor the location of the terminal. As long as the terminal is within the bounds of the designated area, the system behaves normally. As soon as, or with slight delay, the terminal is taken outside the access point area, the terminal senses loss of contact with the access points and enables the terminal alarm mechanism. This method of operation is useful because it reduces the store's risk of terminal loss. The communication between the terminal and the local access points can be achieved via a wireless RF communication LAN, such as the Spectrum24 network. It should be obvious to one skilled in the surveillance art that other embodiments of the security mechanism can be utilized. As long as the unauthorized removal of a terminal from the dispenser rack and from the designated boundary area can be monitored, the system's efficiency of operation can be increased and the store's risk of terminal loss or damage can be reduced.

While there have been described what are believed to be the preferred embodiments of the present invention, those skilled in the art will recognize that further changes and modifications may be made thereto without departing from the spirit of the invention, and it is intended to claim all such changes and modification as fall within the true scope of the invention. For example, although the present invention has been described in the context of a self-service shopping system, the invention may be applied to any terminal system whether employed in retail or other data collection system.

What is claimed is:

1. A system that distributes one of a plurality of terminals to an authorized customer for self-service transaction, the system including:

a terminal for authorized use during a self-service transaction;

a first component that senses unauthorized possession of the terminal; and a second component that indicates the unauthorized possession of the terminal by the first component.

2. The system of claim 1, further comprising a terminal storage rack, whereby the second component indicates the unauthorized possession of the terminal upon an unauthorized removal of the terminal from the storage rack.

3. The system of claim 1, the first component is located in the storage rack.

4. The system of claim 1, the first component is a proximity sensor.

5. The system of claim 1, the first component is an electro-mechanical sensor.

6. The system of claim 1, further comprises a terminal receiving and dispensing rack.

7. The system of claim 6, the terminal receiving and dispensing rack contains terminal sockets that provide electrical power to the terminal when docked.

8. The system of claim 1, the terminal and the rack is facilitated via a wireless network.

9. The system of claim 1, the first component is one of a contact and a non-contact sensor.

10. The system of claim 1, the terminal authorizes use via one of a magnetic stripe card, smart card and an optical-readable bar code.

11. The system of claim 1, the second component is one of an audio device, a visual device and a wireless device.

12. The system of claim 1, a third component that indicates a terminal is available for selection via a visual indicator.

13. A method for distributing terminals to an authorized user for self-service transaction, comprising:

storing a plurality of terminals on a terminal storage rack;

verifying identification of a user;

authorizing distribution of the terminal to the user;

sensing authorized possession of the terminal upon removal from the storage rack; and indicating authorized possession of the terminal.

14. The method of claim 13, the user identification is one of: a magnetic stripe card, smart card and an optical-readable bar code.

15. The method of claim 13, user identification is verified via one of: manual entry, scanning a user ID and keying.

16. The method of claim 13, the user's identification is verified via presenting the user ID to a master controller utilizing a machine-readable device.

17. The method of claim 13, the removal of the terminal from the storage rack is sensed by the absence of external power.

18. The method of claim 13, sensing authorized possession of the terminal is facilitated utilizing communication to a host computer from the terminal via a wireless network.

19. A system for accessing terminals by authorized users, comprising:

means for storing a multitude of terminals at a location;

means for identifying the user who wishes to access the terminal;

means for sensing the unauthorized possession of the terminal; and means for transmitting a notification that a user has unauthorized possession of the terminal.

* * * * *